United States Patent [19]

McClellan

[11] 4,051,619
[45] Oct. 4, 1977

[54] ARTIFICIAL FISHING LURE

[75] Inventor: Bingham A. McClellan, Traverse City, Mich.

[73] Assignee: McClellan Industries, Inc., Traverse City, Mich.

[21] Appl. No.: 727,027

[22] Filed: Sept. 27, 1976

[51] Int. Cl.² ............................................. A01K 85/00
[52] U.S. Cl. .................................. 43/42.24; 43/42.41
[58] Field of Search ................. 43/42.24, 42.26, 42.34, 43/42.38, 42.41, 42.1, 43.2, 42.31; D22/27

[56] References Cited

U.S. PATENT DOCUMENTS

| | | | |
|---|---|---|---|
| 1,267,627 | 5/1918 | Campbell | 43/42.26 |
| 2,290,433 | 7/1942 | Jeffers | 43/42.26 |
| 2,619,762 | 12/1952 | Summitt, Sr. | 43/42.26 |
| 3,068,604 | 12/1962 | Nyberg | 43/42.24 |
| 3,755,952 | 9/1973 | Oliphant | 43/42.26 |
| D. 224,009 | 6/1972 | Harville et al. | D22/27 |
| D. 241,840 | 10/1976 | Hanna | D22/27 |

Primary Examiner—Warner H. Camp
Attorney, Agent, or Firm—Austin A. Webb

[57] ABSTRACT

An elongated, worm shaped, body of flexible plastic material is molded with a head end somewhat thicker than its tail end, and with a multiplicity of radially projecting spines projecting from its surface from end to end. The spines are arranged in adjacent rows from end to end of the body, and alternate spines in each row are longer than intermediate spines. A fish hook has its shank passed at an angle axially back from the head end of the worm until its eye engages the front end of the body. The shank projects rearwardly at an angle from the body, and the curved hook extends forwardly with its point projecting through the body. The barb is embedded in the body of the worm and the longer spines project beyond the top of the point.

9 Claims, 2 Drawing Figures

ARTIFICIAL FISHING LURE

OUTLINE OF INVENTION

An elongated worm-like body of flexible plastic has a multiplicity of flexible spines disposed over its surface and formed integrally with the body. The shank of a hook enters the head end of the body with the eye of the hook abutting the body. The shank passes through the body at an angle and exits the body at a point rearwardly of the head end of the body. The curve of the hook is located almost entirely exteriorly of the body, and the point and barb of the hook project forwardly into the body. The point passes through the body and is exposed between several of the spines but short of the outer ends of the spines. The barb is embedded within the body. Some of the spines, such as alternate ones in each row of spines may be shorter than the others.

The chief advantages of the construction of the lure are first, that the point of the hook is exposed between the spines for early and sure engagement with the mouth of a fish striking the lure. At the same time the spines directly in front of the hook prevent weeds or other obstructions from being snagged by the point. The lure is thus "weedless". Secondly, besides making the lure weedless, the spines impart a twitching motion to the body of the worm as the spines strike against weeds and roots. This gives the lure a life-like action. Thirdly, air is entrapped between the many spines and carried by capillary action into the water as the lure is cast. The air is released as small bubbles as the lure is drawn through the water, thus attracting attention of fish to the lure. Fourth, the flexible ends of the thin spines give the lure a soft resistance apparently attractive to the bite of fish as they strike the lure.

DESCRIPTION

The drawings, of which there is one sheet, illustrate a preferred embodiment of the lure.

Figure 1:
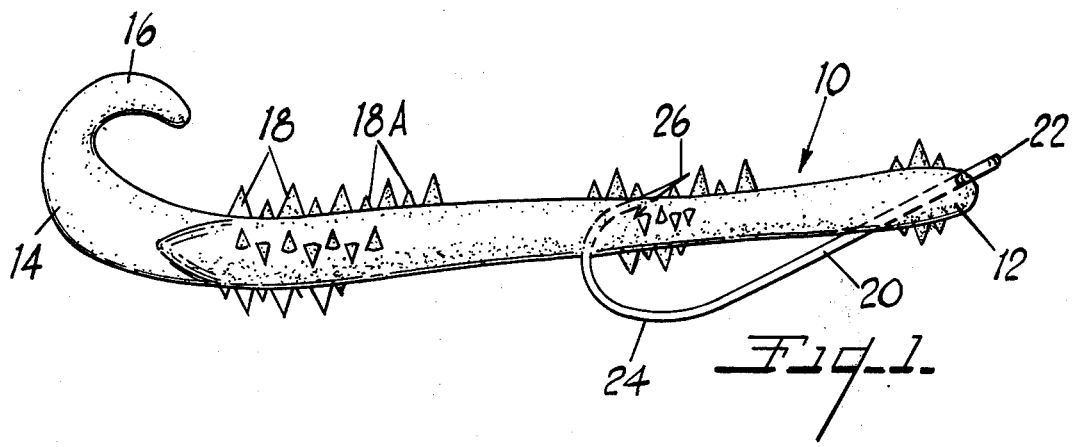
FIG. 1 is a side elevation of the lure.
Figure 2:
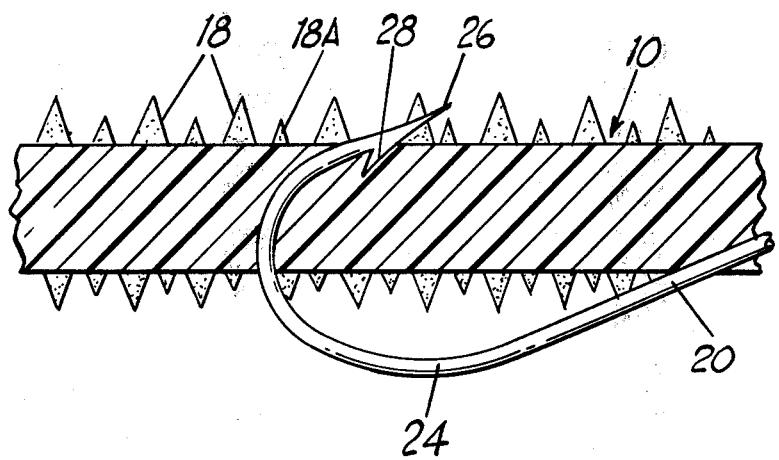
FIG. 2 is an enlarged fragmentary, axial cross section of the lure in the area of the hook, showing the hook in elevation.

The lure has an elongated body 10 of soft molded plastic which may be tapered as shown, providing a head end 12 and a rear or tail end 14. A flattened and curved tail 16 may be provided if desired, but this is not necessary.

Molded integrally with the body 10 are a multiplicity of thin, tapered, fingers or spines 18. The spines are slightly shorter than the thickness of the body, and cover substantially the whole surface of the body. The spines may be arranged in any pattern, but the rows of spines illustrated is convenient. As shown in the drawings, the longer spines project from the body for a distance between one-quarter and one-half of the diameter of the body. Alternate spines 18A in each row may be shorter than the others. The array of spines may be limited to the area of the hook as will be described, but covering the entire body 10 as shown is desirable.

A hook has a straight shank 20 passed through the head end 12 of the body at an angle to the axis of the body, so that the shank exits from the body rearwardly of the head. The eye 22 of the hook is pressed back against the head end 12. The majority of the shank, and a large part of the curve 24 of the hook, are exposed on the outside of the body and the ends of the spines.

The pointed end 26 of the hook is pressed forwardly through the body so that it lies within the envelope created by the outer ends of the spines 18, and desirably just behind the end of one of the shorter spines 18A. The barb 28 is embedded in the body 10, and prevents retraction of the point into the body. At the same time, the barb is easily projected forwardly through the body by the bite or "strike" of a fish.

The action and purposes of the parts of the lure are described in the Outline Of Invention above. The spines are desirably much more closely spaced around the body of the lure than is illustrated, alternate rows having been omitted for the purpose of more clearly showing the relation of the spines to the surface of the body. The lure may be sold complete with hook as shown, or it may be sold without the hook as the hook is easily installed and the purchaser may wish to use his own favorite type and size of hook.

What is claimed as new is:

1. An artificial fishing lure comprising,
   an elongated worm-like body of soft elastic plastic having a head end and a tail end,
   a hook having a shank passed into the head end of the body and extending at an angle to the axis of the body to exit the body behind the head end,
   the eye of the hook being located adjacent the head end of the body and the rear end of the shank and leading part of the curve of the hook being located exteriorly of the body,
   the point end of the hook projecting forwardly through the body and projecting from the side thereof with the barb of the hook embedded in the body,
   and a multiplicity of thin integral spines on said body and projecting therefrom at least in the area surrounding said point of said hook with a spine in front of said point and projecting therebeyond.

2. A lure as defined in claim 1 in which said spines are disposed in spaced relation over said body from end to end of the body.

3. A lure as defined in claim 2 in which part of said spines are shorter than others of the spines.

4. A lure as defined in claim 3 in which said spines are arranged in generally longitudinal lines along said body with said shorter spines alternating with the longer spines in each row.

5. A lure as defined in claim 4 in which the longer of said spines project from said body further than the point of said hook.

6. An artificial fishing lure comprising,
   an elongated worm-like body of soft plastic having a head end and a tail end,
   and a multiplicity of integral spines on said body arranged in spaced relation to each other and projecting from the surface of the body,
   said spines covering an area of the body which includes and extends angularly around the body at least one-quarter of the circumference of the body at their points of connection to the body, and longitudinally from a point adjacent but spaced from the head end of the body and rearwardly therefrom for at least twice the diameter of the body at their points of connection to the body,
   said spines projecting from the body for a distance at least one-quarter of the diameter and not materially less than one diameter of the body at their points of connection to the body, whereby a hook may be rigged on the lure with the shank of the hook angled downwardly and rearwardly through the head end and with the eye of the shank abutting the head end of the body, and with the curve of the hook exposed and extending upwardly and forwardly and reentering the body until the barb is embedded in the body and the point of the hook is exposed on the opposite side of the body in forwardly projecting relation within the area covered by said spines, and with individual spines located on each side and in front of the point of the hook.

7. A lure as defined in claim 6 in which part of said spines are shorter than others of the spines.

8. A lure as defined in claim 7 in which said spines are arranged in generally longitudinal lines along said body with said shorter spines alternating with the longer spines in each row.

9. A lure as defined in claim 6 in which the spines are disposed over an additional area including the entire circumference of the body and substantially the full length of the body.

* * * * *